United States Patent Office 3,475,445
Patented Oct. 28, 1969

3,475,445
HALOGEN SUBSTITUTED ALKENYL THIAZOLINYLTHIOETHERS
Asher A. Hyatt, Lexington, Mass., assignor to Monsanto Research Corporation, St. Louis, Mo., a corporation of Delaware
No Drawing. Filed Dec. 3, 1965, Ser. No. 511,521
Int. Cl. C07d 91/24; A01n 9/12
U.S. Cl. 260—306.7     3 Claims

ABSTRACT OF THE DISCLOSURE

Novel halogen substituted alkenyl thiazolinylthioethers of the formula

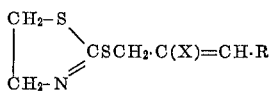

where X is a halogen of atomic weight below 130 and R is hydrogen or an alkyl radical of from 1–5 carbon atoms. The novel compounds are useful as herbicides, defoliants and pesticides, for example.

---

This invention relates to the reaction of 2-thiazoline-2-thiol and its alkali metal salts with allylic dihalides and to the products thereof.

It is an object of this invention to provide new halogen substituted alkenyl thiazolinylthioethers.

Another object of this invention is to provide new compounds useful as biological toxicants, such as herbicides, defoliants, and pesticides, for example.

Still another object of this invention is to provide new compounds useful as pesticides which have low mammalian toxicity.

These and other objects of this invention will become apparent as a detailed description of the invention proceeds.

According to the invention there are prepared new and useful compounds having the formula:

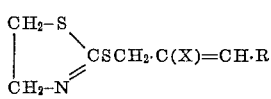

wherein X represents a halogen element of atomic weight below 130 and R represents a member selected from the group consisting of hydrogen and alkyl radicals free of aliphatic unsaturation of from 1 to 5 carbon atoms.

The method for preparing the compounds may vary. One convenient method is effected by contacting the sodium salt of 2-thiazoline-2-thiol with the allylic dihalide, as illustrated by the equation:

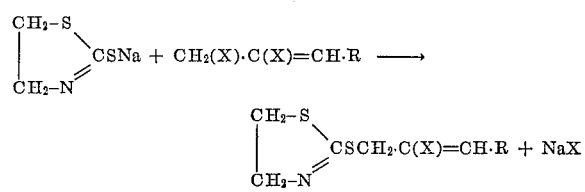

wherein R and X are as defined above.

There are shown below a number of the specific new compounds of the invention. It is not intended that this be complete listing of all the compounds of the invention, but that it merely be illustrative thereof:

2-(2-chloro-2-propenylthio)thiazoline,
2-(2-iodo-2-propenylthio)thiazoline,
2-(2-fluoro-2-propenylthio)thiazoline,
2-(2-fluoro-2-butenylthio)thiazoline,
2-(2-bromo-2-butenylthio)thiazoline,
2-(2-bromo-2-pentenylthio)thiazoline,
2-(2-iodo-2-pentenylthio)thiazoline,
2-(2-chloro-2-hexenylthio)thiazoline,
2-(2-fluoro-2-hexenylthio)thiazoline,
2-(2-bromo-2-hexenylthio)thiazoline,
2-(2-chloro-2-heptenylthio)thiazoline,
2-(2-bromo-2-heptenylthio)thiazoline,
2-(2-iodo-2-octenylthio)thiazoline,
2-(2-bromo-6-methyl-2-heptenylthio)thiazoline,
2-(5,5-dimethyl-2-iodo-2-hexenylthio)thiazoline,
2-(4,4-dimethyl-2-fluoro-2-hexenylthio)thiazoline,
2-(2-chloro-5-methyl-2-hexenylthio)thiazoline,
2-(2-bromo-4,4-dimethyl-2-pentenylthio)thiazoline, and so forth.

Useful allylic dihalides are, for example:

2,3-dichloro-1-propene,
1-bromo-2-iodo-2-butene,
1-chloro-2-fluoro-2-pentene,
1-iodo-2-bromo-2-hexene,
1-fluoro-2-chloro-2-heptene,
1-bromo-2-iodo-2-octene,
2,3-diiodo-1-propene,
1,2-difluoro-2-butene,
1,2-dibromo-2-pentene,
1,2-dichloro-2-hexene,
1,2-diiodo-2-heptene,
1,2-dichloro-2-octene,
1,2-dibromo-6-methyl-2-heptene,
1,2-diiodo-5,5-dimethyl-2-hexene,
1,2-difluoro-4,4-dimethyl-2-hexene,
1,2-dichloro-5-methyl-2-hexene,
1,2-dibromo-4,4-methyl-2-pentene, and so forth.

In carrying out the process of this invention, the thiazoline compound or its alkali metal or ammonium salt is simply contacted with the allylic dihalide until reaction is complete. Generally, the reaction proceeds at room temperature and the reaction mixture may even be cooled, at least initially; it is also an advantage in moderating the reaction to add one of the reactants slowly and gradually to the other, though the reactants may optionally be added all at once, preferably together with a solvent or diluent. Solvents or diluents which may be used to moderate the reaction include polar solvents such as water, methanol, or ethyl alcohol, for example; or inert hydrocarbons such as benzene, toluene, or hexane, and the like.

The ratio of reactants may vary; if desired, molar ratios of thiazoline to halide of at least about 1:10 to about 10:1 may be used. Excess reactant may be removed at the end of the reaction by, for example, extraction or distillation. But since the reaction takes place by the condensation of one mole of thiazoline with one mole of alkene, advantageously a 1:1 ratio of reactant is employed.

No catalyst is needed. Reaction time may vary, in general, it will depend on the nature of the reactant used and on the temperature of the reaction. Ordinarily reaction times will vary from less than one minute to several hours.

Useful temperatures for conducting the preparation are, for example, the reflux temperatures of the reaction mixture where solvents or diluents are used, or any desired temperature from below 0° C. up to below the decomposition point of the ingredients of the reaction mixture.

Atmospheric pressure is satisfactory for conducting the reaction, through sub- or super-atmospheric pressures may be used if desired, ranging from 0.05 millimeters of mercury to about 5000 pounds per square inch.

The isolation of the product may be accomplished by any standard procedure, such as distillation, extraction, or crystallization, for example.

The presently new haloalkenyl thiazolinylthioethers are generally stable, viscous liquids, which are soluble in ethers, such as methyl ether, ethyl ether, or propyl ether, for example.

The new compounds of this invention are useful for a variety of agricultural and industrial applications; for example, the 2-(2-chloro-2-propenylthio)thiazoline may be used as a pesticide, herbicide, or defoliant, and is particularly effective as an insecticide either alone or with a synergist. This compound is potentially useful as an agricultural insecticide because of its moderate toxicity to mammalian species.

The invention will be further described with reference to the following specific examples. These examples are given for purposes of illustration only and are not to be taken as in any way restricting the invention.

EXAMPLE 1

This example illustrates the preparation of a compound in accordance with this invention.

A solution consisting of 14 grams (g.) (about 0.35 mole) of sodium hydroxide dissolved in 100 milliliter (ml.) of water is added gradually to a reaction flask containing a mixture consisting of 42 g. (about 0.35 mole) of 2-thiazoline-2-thiol in 350 ml. of water. The reaction mixture is stirred for one hour at ambient temperature and filtered. To the filtered liquid is added gradually 39 g. (about 0.35 mole) of 2,3-dichloro-1-propene; an exothermic reaction occurs, the temperature of the reaction mixture rising from 26.5° C. to 28.0° C. in 34 minutes. The mixture is stirred for 4 hours, placed in a separatory funnel and the oily layer drawn off. The yellow oily liquid is dissolved in ether, washed several times with 2% sodium hydroxide, rinsed with water until the wash water gives a neutral reaction with litmus paper and then distilled. The oily residue is dried, filtered, and distilled.

The resulting product is 2-(2-chloro-2-propenylthio)-thiazoline an oily liquid weighing 42 g. (about 62% theoretical yield) boiling at 119°–120° C./0.55 mm., $n_{20}^D$ 1.5938.

Analysis confirms the assigned empirical formula $C_6H_8ClN_2S$.—Percent calculated: C, 37.2; H, 4.2; N, 7.2. Percent found: C, 37.4; H, 4.0; N, 7.3.

EXAMPLE 2

This example illustrates the use of a compound of this invention as a pesticide for the destruction of lower animal life forms.

In insecticidal screening, activity for control of mosquito larvae is demonstrated as follows. The product of Example 1 and 2-(2-chloro-2-propenylthio) - 4 - methylthiazole, a known related compound, are each, individually, mixed with 50 ml. of water and 0.5 ml. of acetone to provide 10 parts per million (p.p.m.) concentrations of the compounds in the liquids.

Some 20 early fourth instar yellow fever mosquito larvae (*Aedes aegypti*) are placed in the containers holding the solutions of the compounds and held there at room temperature for 24 hours. The thiazole compound produces no effect on the larvae, while the product of Example 1 produces a 60% mortality.

When 0.1 ml. of a mixture of 3 standard insecticides (of the chlorinated hydrocarbon, carbamate and organic phosphorous type, respectively) in acetone, which in itself would produce about 5% mortality rate in the larvae, is now added to the partially killed larvae in the solution, a 100% mortality occurs within another 24 hours in the mixture containing the product of Example 1, (2-(2-chloro-2-propenylthio)thiazoline, and 20% in that containing the thiazole compound. In a further test, 20 larvae are added to 50 ml. of an aqueous solution containing 2 p.p.m. of the thiazoline compound and 0.5 ml. of the above described insecticide mixture, which produces only 0.10% mortality alone. The solution with the thiazoline present produces a 30% kill of the larvae.

EXAMPLE 3

This example illustrates the use of a compound of this invention as a defoliant.

To test the foliant activity, Black Valentine bean plants, 4 to a pot, are grown to the stage of having 1 mature trifoliate and one partially opened trifoliate and then sprayed with 2-(2-chloro-2-propenylthio)thiazoline in an aqueous emulsion at rates of 0.1 and 1.0 lb./acre (1 lb./A), using a dilution of 30 gallons/acre after which the plants are maintained in a greenhouse within temperature limits of 70°–90° F. The plants are defoliated in the range of 76–99% in 14 days at the higher rate, while about 25% defoliation occurs at the lower rate.

EXAMPLE 4

This examples illustrates the use of a compound of the invention for the control of plant species.

Aluminum pan flats are filled with mixtures of two-thirds one-quarter mesh sieved soil, and one-third sand. Over one-third of the soil surface of each pan are scattered 20 seeds of differentt kinds of grasses; seeds of broadleaf plants are randomly scattered over the remaining surface. The seeds are then covered with soil to the pan top and the pan is sprayed with an aqueous solution of fertilizer and an insecticide. The surfaces of the boxes are next sprayed with 30 ml. of an acetone solution of the propenyl compound provided as described in Example 1, at a rate equal to 25 lbs./A of the chemical. Then the pans are placed in water and allowed to absorb moisture until the soil surface is completely moist, after which they are held in a green house under standard conditions of moisture and sunlight. After ten days, the number and species of plants which have germinated and grown are observed.

The results of the test indicate that the product of Example 1 causes substantially complete suppression of plant germination and growth on foxtail and crabgrass, while it produces no effect on radish and soybean plants.

The new compounds of this invention are generally applied for herbicidal and pesticidal use in the form of sprays and aerosols. Useful sprays may be prepared by dispersing the present products in water with the aid of a wetting agent, to prepare aqueous dispersions which may be employed as by sprays. For example, a solution containing a cyclohexanone and a polyalkylene glycol ether long chain alkylbenzene sulfonate emulsifier may be used to prepare such dispersion or emulsions. The products may also be applied to plants as oil-in-water-emulsion sprays. The present products may also be dispersed or dissolved in liquified gases such as fluorochloroethanes or methyl chloride and applied to plants and pest species from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The concentration of the toxicant compounds in the composition as applied will vary with the active ingredients, the manner of application, the species to be destroyed and the resistance of the organism to be sprayed, for example, and formulation and ratio of applications are suitably adjusted in accordance with these factors.

It is apparent that this invention may be extended to areas beyond those specifically described and that many widely differing embodiments can be made without departing from the spirit and scope thereof as defined herein. Therefore, it is not intended to be limited except as indicated by the appended claim.

What is claimed is:
1. A compound having the formula

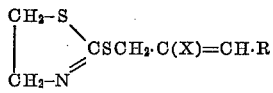

wherein X represents a halogen element of atomic weight below 130 and R represents a member selected from the group consisting of hydrogen and alkyl of from 1 to 5 carbon atoms.

2. A compound of claim 1 wherein X is chlorine.
3. A compound of claim 1 wherein R is hydrogen.

References Cited

FOREIGN PATENTS 1,011,845   12/1965   Great Britain.

OTHER REFERENCES

McGinty et al., Chem. Abst., vol. 40, columns 1595–6 (1946). QD1, A51.

HENRY R. JILES, Primary Examiner
NATALIE TROUSOF, Assistant Examiner

U.S. Cl. X.R.

71—73, 90; 260—654; 424—270